(12) United States Patent
Roberts

(10) Patent No.: US 12,474,428 B2
(45) Date of Patent: Nov. 18, 2025

(54) DEVICE AND METHOD FOR TRACKING OBJECTS

(71) Applicant: The Secretary of State for Defence, Salisbury (GB)

(72) Inventor: Paul Richard Roberts, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 312 days.

(21) Appl. No.: 18/044,087

(22) PCT Filed: Sep. 16, 2021

(86) PCT No.: PCT/GB2021/000104
§ 371 (c)(1),
(2) Date: Mar. 6, 2023

(87) PCT Pub. No.: WO2022/069848
PCT Pub. Date: Apr. 7, 2022

(65) Prior Publication Data
US 2023/0324491 A1    Oct. 12, 2023

(30) Foreign Application Priority Data
Sep. 30, 2020 (GB) .................................... 2015455

(51) Int. Cl.
*G01S 1/02* (2010.01)
*G01S 5/00* (2006.01)
(Continued)

(52) U.S. Cl.
CPC ................ *G01S 1/02* (2013.01); *G01S 5/017* (2020.05); *H04W 4/029* (2018.02); *H04W 88/08* (2013.01)

(58) Field of Classification Search
CPC ........... G01S 1/02; G01S 5/017; H04W 4/029
(Continued)

(56) References Cited

U.S. PATENT DOCUMENTS 10,037,508 B1    7/2018  Rusnak et al.
2013/0072227 A1  3/2013  Morgan et al.
(Continued)

FOREIGN PATENT DOCUMENTS

| CA | 3030040 C | * 12/2021 | ............... G01S 5/00 |
| CA | 2944725 C | * 11/2022 | ............ G01S 19/14 |
| WO | 2018203205 A1 | 11/2018 | |

OTHER PUBLICATIONS

United Kingdom Patent Application No. GB2015455.5, Combined Search and Examination Report dated Mar. 15, 2021, 5 pages.
(Continued)

*Primary Examiner* — Harry K Liu
(74) *Attorney, Agent, or Firm* — Kilpatrick Townsend & Stockton LLP

(57) ABSTRACT

A method and tracker for determining the location of an object, such as a parcel or luggage. The tracker periodically transmits a wireless access point beacon comprising SSID (network name) and a MAC address, in accordance with an IEEE 802.11 standard, has a power storage device, and an energy harvesting module. A server monitors data from 3rd party mobile devices regarding the locations of wifi beacons, and the user is informed of the relevant location if the beacon of the tracker is uploaded to the server. When the tracker is moved and/or it comes into range of one of the wireless portable devices, the user is informed of its location. This enables indefinite tracking especially in urban areas, worldwide.

15 Claims, 2 Drawing Sheets

(51) Int. Cl.
*H04W 4/029* (2018.01)
*H04W 88/08* (2009.01)

(58) Field of Classification Search
USPC .......................................... 342/386
See application file for complete search history.

(56) References Cited

U.S. PATENT DOCUMENTS

| | | |
|---|---|---|
| 2019/0138767 A1 | 5/2019 | Swart |
| 2019/0387363 A1 | 12/2019 | Olufosoye |
| 2020/0110150 A1 | 4/2020 | Reed et al. |
| 2020/0111343 A1 | 4/2020 | Krejcarek |

OTHER PUBLICATIONS

International Patent Application No. PCT/GB2021/000104, International Search Report and Written Opinion mailed Feb. 4, 2022, 15 pages.
United Kingdom Patent Application No. GB2113568.6, Search Report dated Feb. 4, 2022, 4 pages.

* cited by examiner

DEVICE AND METHOD FOR TRACKING OBJECTS

The present invention relates to the field of electronic trackers to be placed on or in an object to track them.

In the past such trackers have generally fallen into the following categories:
1. Those that periodically transmit a radio signal to be detected at a range of kilometres such as for tracking animals in the wild—this requires a large amount of power.
2. Those that determine their location via GNSS receiver, and which connect to a server to upload their location via CDMA GSM, 2G, 3G, 4G etc—both the location determination and the upload transmission requires a large amount of power.
3. Those that transmit using Bluetooth®. These require much less power, but the user needs to be nearby to detect them.

This leaves the problem that it is not possible to provide a self-contained tracking device for luggage, parcels and a wide range of other objects (for example any object that is at risk of theft, in which an electronic device could be placed), on a worldwide basis, for long or indefinite periods of time, without the user needing to access the object to renew the power source.

According to a first aspect of the invention there is provided the method set out in claim 1. According to a second aspect of the invention there is provided the tracker as set out in claim 9.

This has the advantage that on some occasions when the tracker is moved into range of one of the $3^{rd}$ party wireless portable devices, the user will be informed of its location. Whilst successful tracking is not guaranteed, and relies on the device being in the vicinity of suitable devices (e.g. smartphones/devices running specific software/apps and being carried by members of the public), it operates in a relatively self-contained manner (i.e. not needing to be connected to an external electrical power source) potentially indefinitely and worldwide.

Preferably the energy harvesting module is a vibration energy harvester module, or a radio spectrum energy harvester module. This has the advantage that the tracker can be placed in the object without needing to arrange for it to be on the surface of the object and without it needing to be at any particular location in or on the object.

Preferably the wireless transmitter is arranged to periodically change the SSID and/or MAC address (typically both) it transmits to one of a predetermined plurality of configurations.

This has the advantage that the path of the tracker cannot so easily be determined by a $3^{rd}$ party.

Preferably the wireless transmitter comprises a clock, and is arranged to periodically change the SSID and/or MAC address it transmits to one of a predetermined plurality of configurations, more often than once a week, but less often than once a minute.

This ensures the change occurs at a useful frequency to minimise tracking by $3^{rd}$ parties, but not so often that the tracker can readily be identified as being a device that changes its SSID and/or MAC address.

Preferably the wireless transmitter comprises a movement detector comprising a sensor adapted to detect one or more physical parameters associated with movement, and is arranged to identify periods of time when the tracker is comparatively likely to be moving, and periods of time when the tracker is comparatively likely to be stationary, according to a predetermined criterion related to the physical parameter(s), and to preferentially change the wireless access point beacon during periods when the tracker is comparatively likely to be moving.

Avoiding changing beacon data whilst stationary avoids highlighting to $3^{rd}$ parties that the device is a tracker, whilst promoting changing beacon data whilst moving helps minimise tracking by $3^{rd}$ parties, and reduces the number of beacon data examples that the device has to change to and which need to be monitored for. If this could be kept down to dozens rather than millions it simplifies the approach and also minimises the problem of different devices potentially ending up with the same beacon.

Preferably the physical parameter associated with movement is temperature, vibration, acceleration, ambient air pressure, orientation (which may be detected by measuring ambient magnetic field direction and gravity field orientation), or activity in the radio spectrum, or changes thereof.

All of these physical parameters can be indicators of movement, for example when luggage is placed into an aircraft and flown at high altitude, the temperature, air pressure, vibration and radio spectrum activity would all change to within certain ranges which can be determined by simple trial and error. Similarly if portable two-wheeled luggage is rolled, a particular range of orientation indicates movement. More generally acceleration and rotation, and changes in ambient air pressure or radio spectrum activity are all associated with motion.

Preferably the one or more physical parameters associated with movement comprises at least two such physical parameters associated with movement.

This has the advantage of better discriminating periods of movement from stationary periods.

According to one embodiment the step of providing and monitoring a server, or monitoring a server provided by a $3^{rd}$ party, comprises monitoring a subset of locations of wireless access points (that is to say, monitoring the data regarding the locations for a subset of devices), the subset being those wireless access points for which the server received multiple locations which differ by more than a predetermined criterion. This means that the server is storing information about, or giving access to search, wireless access points identified as having moved in preference to those which have not been identified as having moved (whereas by contrast typical servers involved with monitoring the locations of wireless access points preferentially discard information about those that move, since mobile wireless access points are of little or no use in providing a traditional geolocation service). Optionally a service is provided, giving the user the ability to search location data of mobile wireless access points but not to retrieve results for stationary wireless access points in the database, or optionally in a first database the locations of wireless access points are stored, however for those identified to be mobile, those are then stored in a separate database (and potentially deleted from the first database) and the user is given access to search the separate database. A further alternative is to allow searching for a specific (or limited range of) SSID and/or MAC address(es) in a database of locations of wireless access points, either mobile ones, or both mobile and stationary ones, which is particularly advantageous if one entity both provides the tracker and the database.

The predetermined criteria should be chosen such that stationary wireless access points are mostly excluded, but any wireless access points identified as having been at disparate locations are included. The criteria for whether the locations are disparate can be a simple one, such as that a difference in position of more than 100 m, or more than 1000 m is deemed to indicate movement. The value chosen depends on the typical signal range of the device. However since most such apps/software on phones/etc record also the signal strength it is usually possible to determine a location as a range or area, being the area that the device must be within. Therefore the criteria can simply be that the two areas do not overlap. Optionally the subset is selected by periodically deleting those devices which appear not to have moved, for example weekly, monthly or yearly.

The use of a device which changes its SSID/MAC is not necessarily incompatible with using such a database focused on devices identified as having moved, but only if the SSID/MAC changes are such as to ensure that the SSID/MAC avoids being different in different locations (for example if they change frequently (e.g. every minute) or if they change specifically in response to detected apparent movement of if they cease transmitting during detection of apparent movement and resume with a different SSID/MAC after the apparent movement ceases).

A preferred embodiment of the invention will now be described, by way of example only, and with reference to the figures in which.

Figure 1:
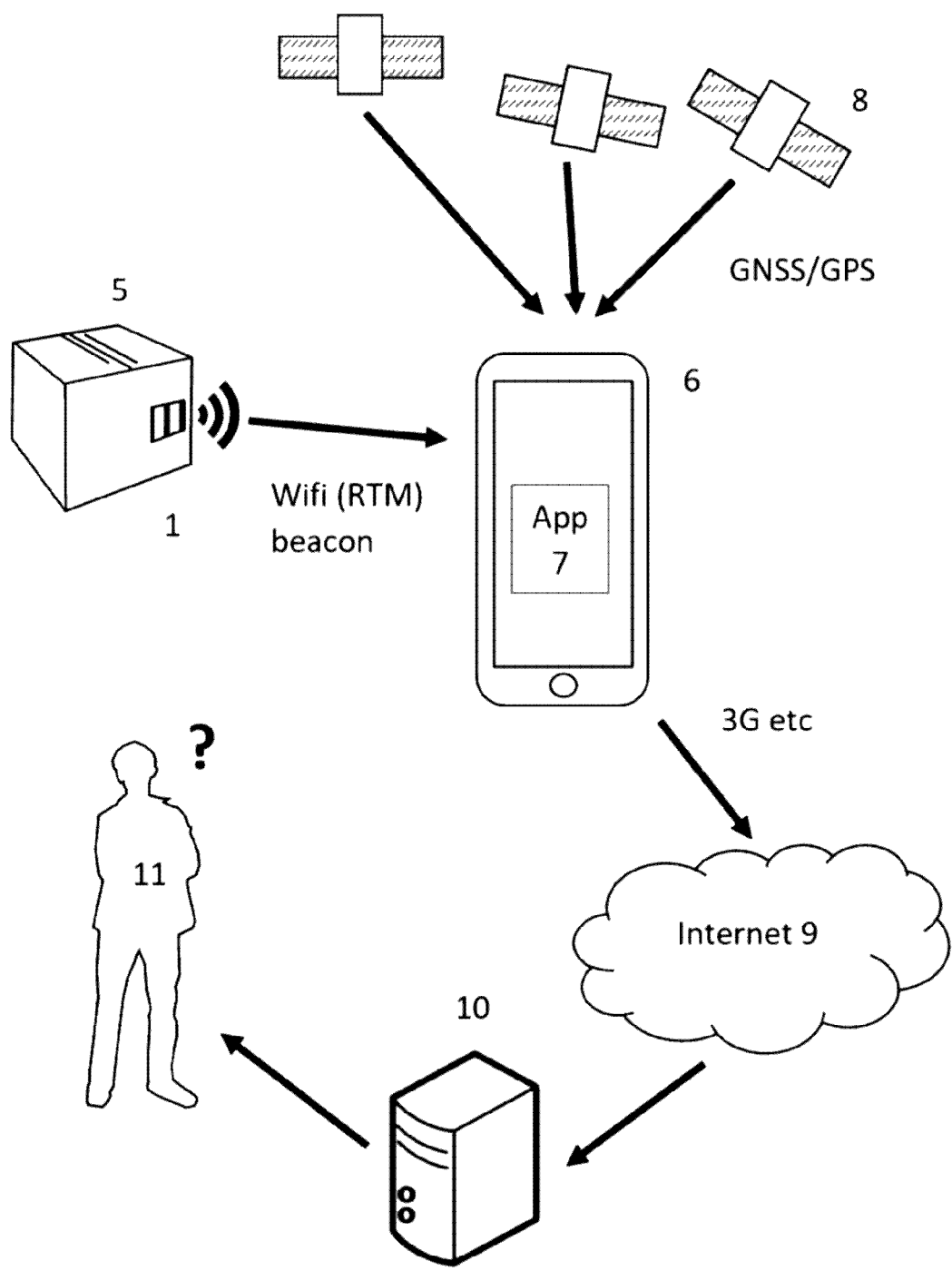
FIG. 1 is a diagram of a tracking method according to one embodiment.
Figure 2:
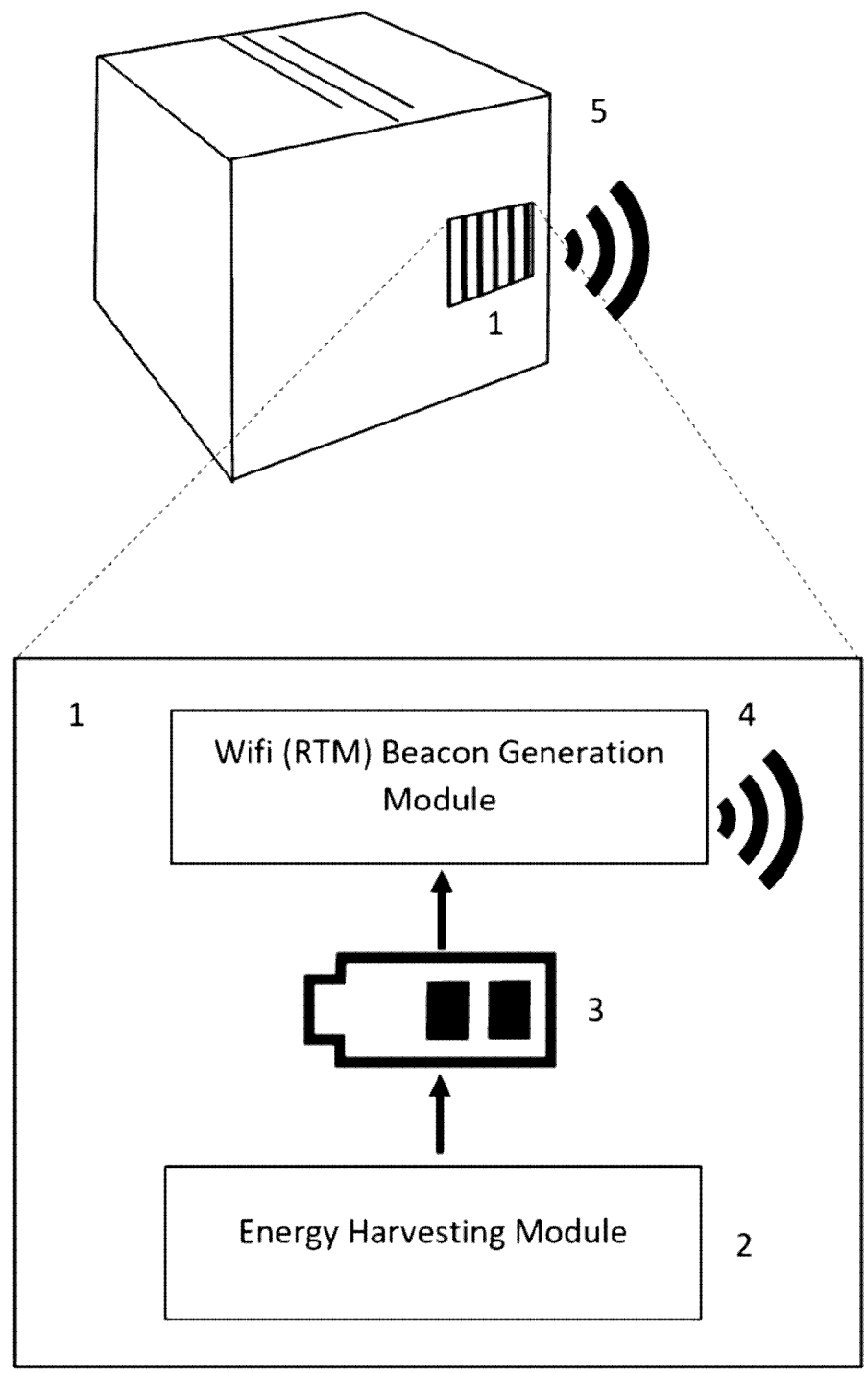
FIG. 2 is a diagram of a tracker according to an embodiment.

Turning to FIG. 1 a method is depicted of determining the location of an object. A tracker 1 is placed in an object to be tracked 5 which might be a parcel being posted, or might be the property of the user who wishes to track it. FIG. 2 shows a close up view of this, including enlarged portion (dotted lines) showing the tracker 1.

Tracker 1 comprises a wireless transmitter 4 arranged to periodically transmit a wireless access point beacon. This generally comprises the SSID (network name) and MAC address, in accordance with an IEEE 802.11 standard. Note that it is not necessary for the transmitter to receive signals, nor to actually act as a full Wifi® hotspot. It only needs to broadcast the beacon with its identifying details. Preferably the beacon includes a parameter identifying the transmission power. This facilitates more accurate location of the device.

Tracker 1 also comprises a power storage device arranged to be charged with energy, and arranged to power the wireless transmitter. This is generally a rechargeable battery or capacitor, typically a capacitor. This builds up charge until there is sufficient charge to power the transmitter. In the simplest embodiment the transmitter transmits a beacon each time that there is sufficient charge. Generally this requires a trigger, such as a voltage detector or switch to determine when there is sufficient charge. Thus the transmitter may transmit a beacon whenever current is supplied to it via the switch.

Tracker 1 also comprises an energy harvesting module 2. This may be a vibration energy harvesting module, as is well known in the art and commonly used in vibration powered watches, or may be a radio spectrum energy harvesting module. A third possibility is that it may be a solar cell however this requires that the solar cell is arranged to receive light, generally requiring it to be placed on the surface of the parcel or object being tracked. Preferably however an energy harvesting device which does not require this is used, such as a vibration harvesting or radio spectrum energy harvesting device. The term vibration harvesting covers devices where motion is converted to electrical energy, whether that be noise, vibration in the conventional sense (for example vibration from a parcel being moved or a vehicle engine running), acceleration, rotation etc.

Generally the tracker components are housed in a housing. Preferably the tracker fits within a space 9 cm×6 cm×0.5 cm, to enable it to be carried conveniently in many typical credit card holders.

It is necessary to record the wireless access point beacon—i.e. the SSID and/or MAC address, usually both. Without knowing this it will be impossible to track the tracker.

Referring specifically to FIG. 1, the tracker transmits the beacon which is interpreted by a portable device as a Wifi® hotspot, even though the tracker is typically unable to receive data or provide data from the internet.

Members of the public have mobile devices 6 which contain apps 7—application software which may be installed via an app store, may be pre-installed, or maybe integral to the operating system. The apps use the GNSS receiver (not shown) to receive GNSS (e.g. GPS) location data from GNSS satellites 8, to determine the approximate location of the tracker (this will be inaccurate to a few 10s of meters/yards) since it is the location of the mobile device which gets reported, not the precise location of the tracker, however this is adequate when tracking a parcel or luggage around the world.

Several companies exist whose primary objective is to track the locations of Wifi® routers/hotspots around the world, for example to sell access to this data so that mobile devices can use the hotspots as signals of opportunity to locate themselves faster and more easily than is possible using GNSS/GPS signals, for example this is useful whilst waiting for a GNSS receiver fix which can take up to 30 seconds, or in high rise buildings where GNSS signals are unreliable.

These companies typically provide a software application for the portable devices (e.g. smartphones) of many people, typically millions of people. Often the software application (app) is provided through an app store, but may alternatively be embedded in the operating system or standard installed software of the portable device.

As such it is possible to access such database hosted services, to determine the location of most Wifi® hotspots in the world. Thus by providing a wifi hotspot, it typically will appear on the database of such companies in a matter of hours or days assuming it is located somewhere frequented by the general public, where GNSS signals can be detected.

Some of these databases are accessible publicly

The beacon details which were recorded, are now monitored in one or more of those databases. For example Wigle.net™ offer access to the public to find any wifi hotspot, at at time of writing have recorded 9 trillion observations of the locations of 6 billion wifi hotspots, typically recording 200,000 per day. Wigle™ has 200,000 members who have installed the WiGLE WiFi Wardriving Tool™ on Android®, which records the locations of 802.11a/b/g/n and cellular networks. Wigle™ is not the only organisation that collects such data, it is however one of the most open databases.

In comparison Wigle™ also collects Bluetooth® beacons however since these present a greater privacy threat they do not make this data available to the public, and indeed fewer organisations would collect such data, partly because of the privacy implications and partly because Bluetooth® devices tend to be mobile and thus are of less value as a geolocation aid.

Thus one embodiment involves actively providing and monitoring a server, but a preferred embodiment involves monitoring a server provided by a 3$^{rd}$ party. This may include paying a 3$^{rd}$ party for access to the data, or paying a 3$^{rd}$ party to provide a notification (e.g. and the location) when a beacon matching the desired data is collected. Thus monitoring includes everything from paying to be notified, to periodically checking.

The server is arranged to receive via the Internet, and to collate, locations associated with wireless access points from respectively authenticated apps of 3$^{rd}$ party GNSS enabled portable devices, the apps being adapted to control their respective devices to detect wireless access point beacons and report them to the server along with GNSS locations of the devices at the time of the detection.

The final step is that when a device belonging to a member of the public has identified the beacon and uploaded its details and the location. This information gets provided to the user. Thus the user is kept informed of where their package is, or where their luggage is, etc. This can also be used for tracking some types of wildlife such as many birds, urbanised animals and pets, since they will come into proximity with the public. Trackers are also legitimately used by parents to keep track of their young children and also carers to keep track of mentally ill loved ones, and the invention is applicable to all lawful types of tracking especially in urban environments.

Preferably the SSID changes periodically. Preferably the MAC address changes periodically. Ideally both the SSID and MAC address change periodically (generally simultaneously).

For brevity, a full description is not provided here for how energy harvesting devices work, such as solar cells, thermoelectric devices, piezoelectric devices, vibration/motion energy harvesting devices, and radio frequency energy harvesting devices. This is because any energy harvesting device which outputs electrical energy can be used, and coupled with a charging circuit to a capacitor of rechargeable battery a wide range of voltages can be utilised. Therefore there is no difficulty connecting any of the known energy harvesting devices of the art, with a suitable charge storage device, and using it to power the tracker.

As one of many possible examples, the following devices could be used:

Product number and name: 582-P2110B from Mouser® electronics, Energy Harvesting Modules Powerharvester Receiver—915 MHz Output Voltage: 2 V to 5.5 V, Output Power: 275 mW. Dimensions 13.46 mm (0.53 in)×13.97 mm (0.55 in)×20 mm (0.082 in)

Product number and name: 932-MIKROE-651 from Mouser® electronics Solar Panels & Solar Cells SOLAR PANEL 4.0V 100 mA 70 (2.7 in)×65 (2.5 in)×3.2 mm (0.13 in), Output voltage 4V. Dimensions 70 mm×65 mm×3.2 mm Product number and name: 509-PPA-1014 from Mouser® electronics Energy Harvesting Modules Piezo Transducer and Energy Harvester Output Power: 25.9 mW, Output Voltage 27.3V, Dimensions: 53 mm (2 in)×20.8 mm (0.82 in)×0.74 mm (2.9 in)

The product called Freevolt Smart Access™ offered by Drayson Holdco 2 Limited, and described at the website https://getfreevolt.com advertised as offering up to 2.5V, 90 mA output in some circumstances, with a size suited to be included in conventional credit cards.

More generally there is provided a method and tracker for determining the location of an object, such as a parcel or luggage. The tracker periodically transmits a wireless access point beacon comprising SSID (network name) and/or a MAC address, in accordance with an IEEE 802.11 standard, has a power storage device, and an energy harvesting module. A server monitors data from 3$^{rd}$ party mobile devices regarding the locations of wifi beacons, and the user is informed of the relevant location if the beacon of the tracker is uploaded to the server. When the tracker is moved and/or it comes into range of one of the wireless portable devices, the user is informed of its location. This enables tracking especially in urban areas, worldwide and indefinitely.

The invention claimed is:

1. A method of determining a location of an object:
   providing a tracker by a first user, the tracker-comprising:
      a wireless transmitter arranged to periodically transmit a wireless access point beacon comprising SSID (network name) and/or a MAC address, in accordance with an IEEE 802.11 standard; and
      a power storage device arranged to be charged with energy, and arranged to power the wireless transmitter;
   providing a server and monitoring operation of the server, wherein:
      the server is arranged to receive and to collate, locations associated with wireless access points from respectively authenticated software applications of third party GNSS enabled portable devices, the applications being adapted to control their respective portable devices to detect the wireless access point beacons from at least one tracker and report the detected wireless access point beacons to the server along with GNSS locations of the portable devices at a time of the detection;
   receiving and recording, at the server, the SSID and/or MAC address transmitted in the wireless access point beacon from the tracker and received by at least one of the third party GNSS enabled portable devices; and
   informing, by the server, the first user in an event that a location of the tracker is uploaded onto the server;
   wherein:
      the tracker comprises an energy harvesting module, arranged to collect energy from an ambient source of energy.

2. The method of claim 1 wherein the energy harvesting module is a vibration energy harvester module or a radio spectrum energy harvester module.

3. The method of claim 1 wherein the wireless transmitter is arranged to periodically change the SSID and/or MAC address that it transmits to one of a predetermined plurality of configurations.

4. The method of claim 3 wherein the wireless transmitter comprises a clock and is arranged to periodically change the SSID and/or MAC address that it transmits to one of a predetermined plurality of configurations, more often than once a week, but less often than once a minute.

5. The method of claim 3 wherein the wireless transmitter comprises a movement detector comprising a sensor adapted to detect one or more physical parameters associated with movement, and wherein the wireless transmitter is arranged to:
   identify periods of time when the tracker is comparatively likely to be moving and periods of time when the tracker is comparatively likely to be stationary, according to a predetermined criterion related to the physical parameter(s), and
   preferentially change the wireless access point beacon during periods when the tracker is comparatively likely to be moving.

6. The method of claim 5 wherein the physical parameter associated with movement is temperature, vibration, acceleration, ambient air pressure, orientation, or activity in the radio spectrum, or changes thereof.

7. The method of claim 5, wherein the one or more physical parameters associated with movement comprises at least two such physical parameters associated with movement.

8. The method of claim 1, wherein the step of providing the server and monitoring the operation of the server, comprises monitoring a subset of locations of wireless access points, the subset being those wireless access points for which the server received multiple locations which differ by more than a predetermined criterion.

9. A tracker for use in tracking an object via the method of claim 1, the tracker comprising:
- a wireless transmitter arranged to periodically transmit an SSID (network name) and a MAC address as a wireless access point beacon, in accordance with an IEEE 802.11 standard; and
- a power storage device arranged to be charged with energy, and arranged to power the wireless transmitter, wherein:
- the tracker comprises an energy harvesting module, arranged to collect energy from an ambient source of energy.

10. The tracker of claim 9 wherein the energy harvesting module is a vibration energy harvester module or a radio spectrum energy harvester module.

11. The tracker of claim 9 wherein the wireless transmitter is arranged to periodically change the SSID and/or MAC address that it transmits to one of a predetermined plurality of configurations.

12. The tracker or claim 11 wherein the wireless transmitter comprises a clock and is arranged to periodically change the SSID and/or MAC address it transmits to one of a predetermined plurality of configurations, more often than once a week, but less often than once a minute.

13. The tracker of claim 11 wherein the wireless transmitter comprises a movement detector comprising a sensor adapted to detect one or more physical parameters associated with movement, and is arranged to identify periods of time when the tracker is comparatively likely to be moving, and periods of time when the tracker is comparatively likely to be stationary, according to a predetermined criterion related to the physical parameter(s), and to preferentially change the wireless access point beacon during periods when the tracker is comparatively likely to be moving.

14. The tracker of claim 13 wherein the physical parameter associated with movement is temperature, vibration, acceleration, ambient air pressure, orientation, or activity in the radio spectrum, or changes thereof.

15. The tracker of claim 13, wherein the one or more physical parameters associated with movement comprises at least two such physical parameters associated with movement.

\* \* \* \* \*